United States Patent [19]

Lippitt et al.

[11] Patent Number: 4,496,899
[45] Date of Patent: Jan. 29, 1985

[54] CONTROL FOR A FORCE COMMUTATED CURRENT SOURCE VAR GENERATOR

[75] Inventors: David L. Lippitt, Scotia, N.Y.; Loren H. Walker, Salem, Va.

[73] Assignee: General Electric Company, Salem, Va.

[21] Appl. No.: 508,599

[22] Filed: Jun. 28, 1983

[51] Int. Cl.³ .............................................. H02J 3/18
[52] U.S. Cl. .................................. 323/207; 323/210; 363/96
[58] Field of Search ............... 323/207, 208, 209, 210, 323/211; 363/96–98, 135, 136, 137, 138; 318/438

[56] References Cited

U.S. PATENT DOCUMENTS

| | | | |
|---|---|---|---|
| 4,019,124 | 4/1977 | Möltgen | 323/207 |
| 4,307,442 | 12/1981 | Yano et al. | 323/207 X |
| 4,352,156 | 9/1982 | Gyugyi | 323/207 X |

OTHER PUBLICATIONS

"Reactive Power Generation and Control by Thyristor Circuits" by Laszlo Gyugyi, IEEE Transactions on Industry Publications, vol. 1A-15, No. 5, Sep./Oct. 1979, pp. 521–532—see especially 524–525.

Primary Examiner—Peter S. Wong
Attorney, Agent, or Firm—Arnold E. Renner

[57] ABSTRACT

The non-linear control characteristic of a force commutated current source inverter operating as a var generator is linearized to provide a similar dynamic response in both leading and lagging modes of operation by two inter-related control schemes. The first control scheme comprises a linear closed loop feedback which controls a thyristor firing circuit in response to a difference or error signal between a var command signal and an actual var feedback signal while the second control comprises a feed-forward non-linear network having a signal transfer function which models the non-linear control characteristic of the var generator and is operative to control the thyristor firing circuit in response to the summation of scaled values of the var command signal and the actual var feedback signal and wherein the scaled values provide a combined gain which is equal to unity.

34 Claims, 4 Drawing Figures

CONTROL FOR A FORCE COMMUTATED CURRENT SOURCE VAR GENERATOR

CROSS REFERENCE TO RELATED APPLICATIONS

This application is related to the following U.S. Patent applications, which are assigned to the assignee of the present invention and which are hereby incorporated by reference:

U.S. Ser. No. 508,711, entitled "Capacitance Control For A Static VAR Generator", filed on June 28, 1983, in the name of Loren H. Walker; and U.S. Ser. No. 508,712, entitled, "Thyristor Voltage Limiter For A Current Source Inverter", filed on June 28, 1983, in the name of Loren H. Walker.

BACKGROUND OF THE INVENTION

This invention relates generally to a method and means for controlling the power factor, the phase angle between current and voltage, of alternating current (AC) transmission lines supplying power to a time varying load and more particularly to a static var (volt-amperes reactive) generator which functions as a variable reactance utilized for load compensation and power factor correction on such transmission lines.

While rotating synchronous condensers and banks of mechanically switched fixed capacitors or inductors have been used in the past for var compensation and power factor correction, recent advances in high power thyristor technology have resulted in the development of controllable static var sources, commonly referred to as var generators. One known general class of var generators, known as current source var generators, comprises a six pulse AC to DC converter with the AC terminals connected to the AC transmission lines and the DC terminals shorted through a DC inductor. A particular type of that class utilizes for its six pulse AC to DC converter the inverter section of a controlled current inverter (CCI).

As disclosed in a publication entitled, "Reactive Power Generation and Control by Thyristor Circuits" by Laszlo Gyugyi, which appeared in the *IEEE Transactions On Industry Applications*, Vol. 1A-15, No. 5, September/October, 1979, pp. 521-532, a current source inverter utilized as a var generator may be either naturally commutated or force commutated. The naturally commutated inverter can only provide lagging vars, while the force commutated inverter can provide both lagging and leading vars. A naturally commutated inverter is comprised of a simple bridge of six thyristors, while a force commutated inverter includes a bridge of six thyristors, series connected diodes and cross coupling capacitors, both circuits being well known to those skilled in the art. A naturally commutated inverter can only operate when the thyristors are fired at such delay angles where the DC current is naturally transferred from one pair of thyristors to the next and thus operates as a controllable rectifier where the delay angle of thyristor firing is restricted to the range of 0° to 180°. By gating the thyristors near 90° lagging; that is, where the AC current lags the voltage by 90°; a voltage of nearly zero volts DC will be generated and the current in the inductor can be controlled by slight changes (advances) in gating angle. Accordingly, the circuit appears as a continuously variable, balanced three phase inductor across the AC line, a source of controllable lagging vars.

In the force commutated inverter configuration, however, the thyristors act like gate turn-off devices capable of being operated over the total firing angle range of 0°-360° and can thus provide both leading and lagging line currents and, accordingly, can selectively act both as a variable balanced three phase capacitor or inductor.

While it is possible to control a force commutated thyristor bridge as a current source var generator (CSVG) in both leading and lagging quadrants, it inherently exhibits a control characteristic which is highly non-linear, includes very large and variable transport delay, and has different control characteristics in leading operation as opposed to lagging operation.

SUMMARY OF THE INVENTION

It is, therefore, an object of the present invention to provide an improvement in var generators and their method of operation.

It is a further object to provide an improvement in the control of current source var generators.

It is another object of the invention to provide a linear control of a current source var generator while operating in both leading and lagging quadrants.

It is still a further object of the invention to provide a current source var generator which exhibits a linear control characteristic with uniform dynamic response.

It is still another object of the invention to provide a current source var generator which exhibits a linearly uniform dynamic response over the entire range of loads from high lagging vars through zero to high leading vars.

The foregoing and other objects are achieved by recognizing the fact that the control characteristic of a var generator comprised of a force commutated current source inverter including a thyristor bridge is substantially non-linear. This non-linearity involves a wide range of gain in vars as a function of gating angle. A negative feedback regulator could not provide both stability and satisfactory regulation of the var generator over a range of operating points where the basic system gains vary so widely. The method and apparatus described with respect to this invention provides satisfactory control of the var generator by establishing the static operating point of the generator by a feed-forward function generator which models the system non-linearities, and then combining this with a conventional negative feedback regulator which controls the dynamic operation and corrects for errors between the feed-forward model and the true system being controlled. Improved transient response is achieved by driving the feed-forward function by a summation of var command and present level of vars. Similar dynamic response in both leading and lagging operation is provided.

BRIEF DESCRIPTION OF THE DRAWINGS

While the present invention is defined in the claims annexed to and forming a part of this specification, a better understanding can be had by reference to the following description taken in conjunction with the accompanying drawings in which:

DETAILED DESCRIPTION

Figure 1:
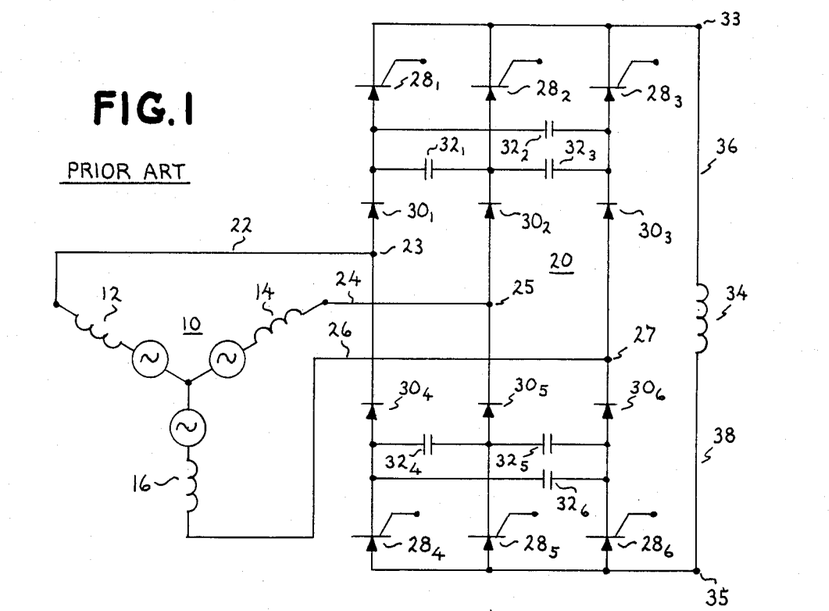
FIG. 1 is an electrical schematic diagram of a force commutated current source var generator in accordance with the known prior art.

Referring now to the drawings and more particularly to FIG. 1, reference numeral 10 denotes a three phase (3φ) alternating current (AC) power source, including local inductive reactances 12, 14 and 16, coupled to a force commutated current source AC to DC inverter (CCI) 20 by means of AC power lines 22, 24 and 26 connected to AC terminals 23, 25 and 27. The current source inverter 20 is comprised of a force commutated thyristor bridge, well known to those skilled in the art, comprised of six thyristors $28_1, 28_2 \ldots 28_6$, respectively series connected diodes $30_1, 30_2 \ldots 30_6$ and six cross-coupling capacitors $32_1, 32_2 \ldots 32_6$. Further, as shown in FIG. 1, an inductor 34 is connected across DC output terminals 33 and 35 of the thyristor bridge by means of circuit leads 36 and 38. A thyristor gating or "firing" circuit, not shown, is adapted to be connected to the respective gate electrodes of each of the thyristors $28_1, 28_2 \ldots 28_6$ for sequentially firing the thyristors at a predetermined delay angle α, measured from the earliest point of natural commutation, and which comprises the zero crossing points of the line-to-line voltages in a three phase AC system.

Further as is well known, the force commutated current source inverter 20, being inductively loaded by the inductor 34, provides a var generator which is adapted to provide either lagging or leading vars (reactive volt-amperes) to compensate for a mutually opposite type of load reactance of a load impedance, not shown, connected to the AC source 10. Such a load impedance typically comprises relatively large lagging (inductive) loads such as electrical machines and line commutated thyristor motor drives. By supplying a reactive power component (vars) substantially equal to and opposite the reactive component of the load, a tuned system is provided which appears substantially as a resistive AC impedance operating to provide a maximum power transfer to the load. The var generator may be controlled to provide strategies other than unity power factor; for example, a strategy for minimum voltage disturbance due to the varying load.

Figure 2:
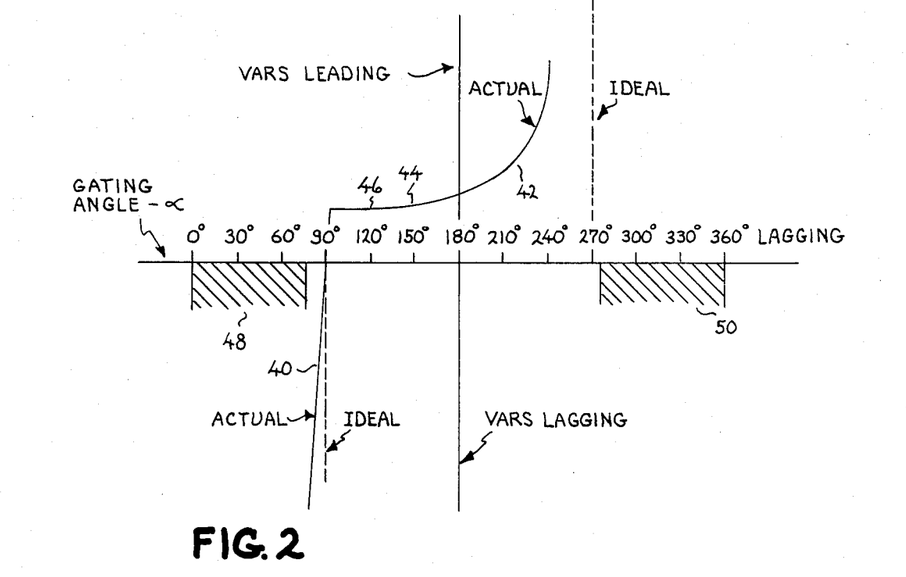
FIG. 2 is a graph illustrative of the control characteristic of a force commutated current source var generator such as shown in FIG. 1.

The var generator 20 shown in FIG. 1 has an operational characteristic such as is illustrated in FIG. 2. This characteristic is shown by a graph depicting the relationship between vars, both lagging and leading, versus the firing delay; i.e., the lagging gating angle α of the thyristors $28_1 \ldots 28_6$. This characteristic can be explained in the following manner. If the circuit configuration of FIG. 1 were a simple bridge of the six thyristors without the series diodes and commutating capacitors, it would simply operate as a controllable rectifier which provides a DC voltage across the inductor 34 which is controllable by varying the delay in gating the thyristors. By gating the thyristors near 90° lagging; i.e., where the current lags the line voltage, a voltage of nearly zero volts DC will be generated and the DC current in the inductor 34 can be controlled by slight changes, such as advances, in gating angle as shown by the linear portion 40 of the characteristic curve shown. With the diodes $30_1 \ldots 30_6$ and the capacitors $32_1 \ldots 32_6$ being included, however, a turn off capability for the thyristors $28_1 \ldots 28_6$ is provided which permits gating over the total firing angle range of 0°14 360° and thus a source of leading vars is obtainable. Accordingly, if the gating is changed to 90° leading, which is equivalent to and thus corresponds to 270° lagging of FIG. 2, the DC output voltage will be zero as it is as 90° lagging. The current level in the inductor will still be controllable by the choice of gating angle, but an advancement of the gating angle, i.e. backing off from 270° will decrease the current according to the non-linear characteristic portion 42 of the actual characteristic shown in FIG. 2. This non-linear leading characteristic 42 is determined by the time it takes to reverse the voltage on the particular commutating capacitor each time a thyristor is gated on in leading operation. This time is typically 30° at maximum DC current at 60 Hz. This time, moreover, is the delay between gating a thyristor and the initiation of current in the corresponding series diode. In order to draw current from the AC line, the diodes must begin conduction at 90° leading, or 270° as shown in FIG. 2. Thus at maximum leading vars, the thyristors are gated at α=240° lagging, which is 30° ahead of 270° lagging, i.e. 90° leading.

The delay between thyristor and diode commutation is approximately proportional to the reciprocal of DC current. This characteristic applies until a current is reached at which the delay in diode conduction is 120° which exists where gating the thyristors occurs at 270°−120°=150° and which occurs at point 44 of the characteristic curve shown in FIG. 2. Current refuses to decrease below this minimum level even though gating angle is changed towards 90° as evidenced by the portion 46 of the characteristic curve due to the existence of the commutating capacitance. The value of the minimum current is given by the expression:

$$I_{dc}(\min) = V_S \sqrt{2} \, \omega \, \frac{3}{2} \, C_\Delta \tag{1}$$

where, $V_S\sqrt{2}$ is the peak line-to-line source voltage, ω is the source frequency in radians per second, and $C_\Delta$ is the capacitance of one of the commutating capacitors $32_1 \ldots 32_6$.

When the gating is advanced further, approaching 90° lagging (FIG. 2), the conduction periods of the diodes $30_1 \ldots 30_6$ overlap until five of the six diodes are in conduction at all times and the capacitors $32_1 \ldots 32_6$ cease to act as commutating capacitors, thus giving rise to the controllable rectifier operation referred to above. The conducting diodes connect the capacitors directly across the AC source 10 and the thyristors $28_1 \ldots 28_6$ to freely pass DC current to the inductor 34, giving rise to the linear characteristic portion 40 of the curve. The gating angle regions 48 and 50 denote excess current regions which are not utilized because they cause a large positive DC voltage across the inductor, and thus cause excessive DC current.

Figure 3:
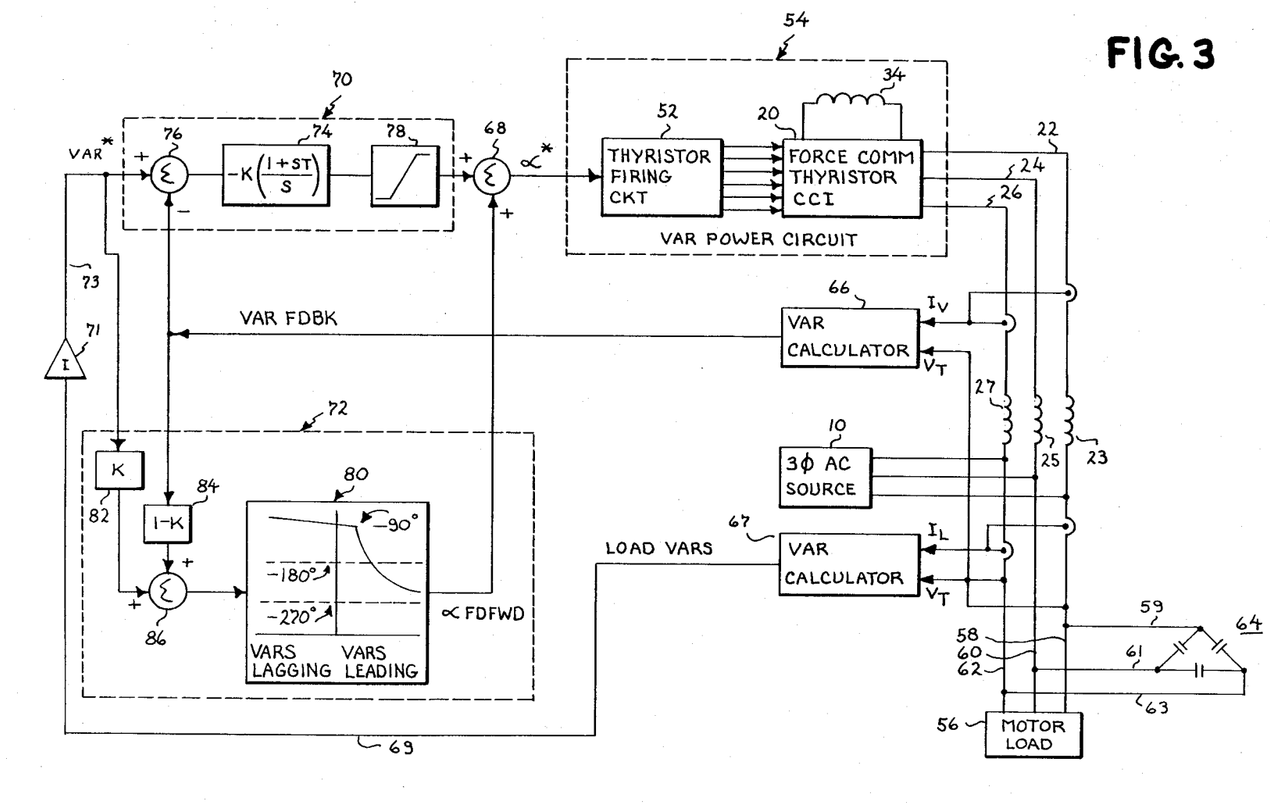
FIG. 3 is a block diagram illustrative of the preferred embodiment of a circuit for linearizing the control of the current source shown in FIG. 1 in accordance with the subject invention.

Referring now to FIG. 3, shown is a means for converting the operation of the current source var generator 20 of FIG. 1, and having a characteristic as shown in FIG. 2, into a var generator having a substantially linear uniform dynamic response while generating both lagging and leading vars. The force commutated current source inverter (CCI) 20 (FIG. 1) is shown in FIG. 3 coupled to a thyristor firing circuit 52, forming thereby a var power circuit 54 which is coupled to the three phase AC source 10 by means of the power lines 22, 24 and 26 and isolating reactors 23, 25, 27. The AC source 10 is further shown coupled to a load 56 comprising, for example, a motor load via the three phase supply lines 58, 60 and 62, and a fixed capacitor bank 64 connected to the motor load terminals via power lines 59, 61 and 63. The fixed capacitor bank 64 serves to partially correct or compensate for the inductance of the load.

Since a motor load has a reactance characteristic which fluctuates over a relatively wide range during its operation, a variable source of compensation is needed and is provided by the CCI var generator 20. The var generator 20 is controlled by a firing angle command signal $\alpha^*$ generated in response to a var command signal (VAR*) and a var feedback signal (VAR FDBK).

The var command (VAR*) can be generated as shown in FIG. 3 to implement a unity power factor control. Var calculator means 67 senses currents $I_L$ and voltages $V_T$ to calculate the total reactive volt-amperes in the load and capacitor bank in a manner substantially like a conventional two watt-meter arrangement. This signal LOAD VARS appears on line 69. It is inverted by inverter 71 and applied as the VAR* signal to the var generator on line 73. By commanding the var generator to produce vars which are the negative of those in the load and capacitors, a net zero vars will be drawn from the AC source 10, and the load will appear as unity power factor.

The var command signal VAR* may be used to accomplish purposes other than unity power factor. An alternate way to generate the var command is shown in the aforementioned copending application Ser. No. 508,711. This shows a var command generated to maintain AC source voltage magnitude undisturbed by the variations of this load.

The VAR FDBK signal is generated by a var calculator circuit 66 which is similar to calculator 67 and which also can be configured substantially like a conventional two watt-meter arrangement which is responsive to two of the line currents $I_V$ and two of the line voltages $V_T$ appearing, for example, on lines 22 and 26 of the AC power line connecting the current source converter 20 to the AC source 10. When desirable, an electronic meter circuit configuration may be utilized.

The firing angle command signal $\alpha^*$ is shown in FIG. 3 comprised of the summation of two $\alpha$ signals applied to a summing junction 68, the first signal being generated by a linear feedback control circuit 70 while the second signal is generated by a non-linear feed-forward control circuit 72. The feedback circuit 70 is operable to essentially control the generation of its firing angle $\alpha$ in response to the error between a var command VAR* and a var feedback VAR FDBK signal whereas the feed-forward circuit 72 is operable to essentially control the generation of its control signal $\alpha$ in response to the sum of the same VAR* and VAR FDBK signals.

As is shown in FIG. 2, the control characteristic for lagging vars is substantially linear, whereas the control characteristic for leading vars is non-linear. Accordingly, the linear feedback circuit 70 includes a linear regulator circuit 74 having an input signal which is the difference or error signal between the var command signal VAR* and the var feedback VAR FDBK and comprises the output of a summing junction 76 to which these signals are applied. The regulator 74 is shown being a proportional plus integral type controller comprised of, for example, operational amplifier configured to operate as a gain amplifier having a transfer junction of $$-K\left(\frac{1 + ST}{S}\right).$$

where S is a LaPlace operator, T is a time constant, and K is a gain constant. This amplifier, when desirable, could also have a simple gain. The output of the regulator 74 is fed to a signal clamp 78 which is adapted to limit the variable output of the regulator 74.

The feed-forward circuit 72 includes a non-linear active network which is designed to have a signal transfer function which matches the actual static characteristic of FIG. 2. It is responsive primarily to the var command signal VAR*. Blocks 82 and 84 represent signal translation devices having a gains given by K and 1−K, respectively, where K ranges between 0.5 and 1.0. If K is equal to unity, then the function of block 72 would be to provide to summing junction 68 the proper value of gating angle alpha corresponding to the var command. Thus the feedback network 70 would provide the dynamic forcing and precise error correction to the value of alpha, while the feed-forward network 80 provides the static set point.

In order to maintain similar dynamic response in both leading and lagging operation, it is necessary to restrict the dynamic operation of the non-linear network 80 inasmuch as the transfer function includes a very high gain region near zero vars in the leading quadrant. This high gain can provide relatively high angle commands for small changes in var command in this region. This effect is offset by supplying an input signal to the network 80 partly comprised of the var command signal VAR* which is coupled thereto by signal scaling circuit element 82 and partly by the var feedback signal VAR FDBK signal which is applied by signal scaling circuit element 84 with the scale factors or gains of the two circuit elements 82 and 84 being selected to have a sum equal to unity by being equal to K and 1−K, respectively. As shown in FIG. 3, the two circuit elements 82 and 84 are coupled to a summing junction 86 which generates a composite drive signal which is then coupled to the input of the non-linear network 80.

Thus, in steady state when the var command signal VAR* and the var feedback signal VAR FDBK are substantially alike, the composite input signal to the network 80 is equal to the operating point dictated by the signal VAR* and the output therefrom is set at the appropriate firing angle command $\alpha^*$. When the var command signal VAR* moves dynamically and the var generator 20 has not as yet responded, the forcing function provided by the non-linear network 80 is reduced by the factor K. By setting the scaling factors of K and 1−K at the proper magnitudes, typically K=0.75 and 1−K=0.25, the transient response in leading operation can be made similar to that lagging operation so that the overall transient response is substantially uniform at all operating points.

It should be noted that the control provided by the combination of the linear feedback circuit 70 and the non-linear feed-forward circuit 72 results in a regulation of reactive volt-amperes (vars) rather than DC current. If DC current though the inductor 34 were regulated, the control of the subject invention would have to have a reversal of sense at the transition from leading to lagging operation and thus would be difficult to operate at zero vars. Furthermore, the use of a combination of non-linear feed-forward control and linear feedback control provides a precise control that is fast responding, linear and stable.

Figure 4:
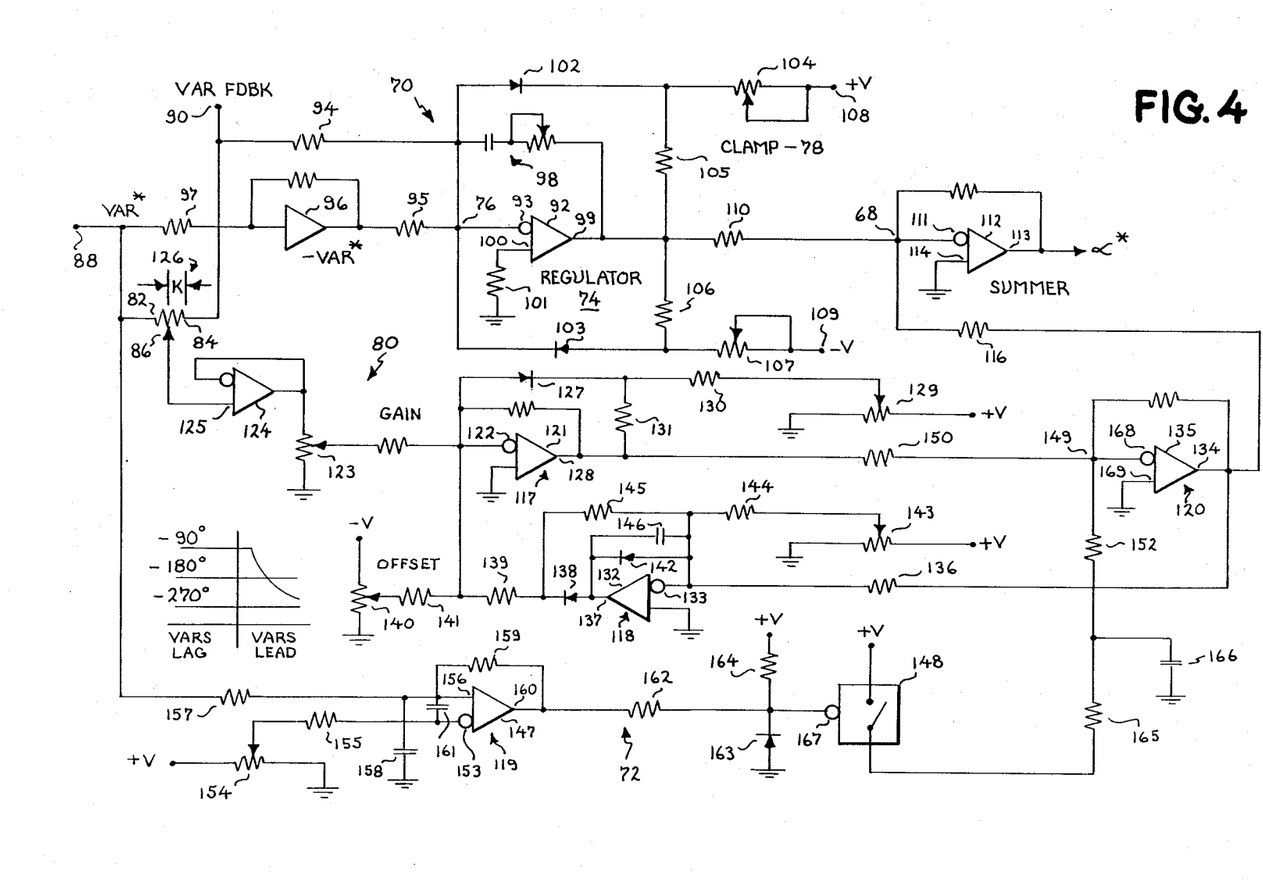
FIG. 4 is an electrical schematic diagram illustrative of circuitry for implementing the var generator control shown in FIG. 3.

Circuitry for implementing the var regulation control shown in FIG. 3 is disclosed in detail by the schematic diagram of FIG. 4. Referring now to FIG. 4 and assuming a convention where zero volts for the signal $\alpha^*$ calls for a gating angle of 180°, and a positive polarity signal is indicative of an advance in gating angle $\alpha$ toward lagging vars; i.e., towards 90° (FIG. 2), while a negative polarity is indicative of a retarding alpha toward leading vars; i.e., towards 270° lagging (FIG. 2), the var command signal VAR* is applied, for example, to terminal 88 while the var feedback signal VAR FDBK is applied to terminal 90. Considering first the linear feedback circuit 70, the regulator 74 is comprised of an operational amplifier 92 having a pair of inputs, one of which is an inverting input, and one of which is a non-inverting input. As shown, the inverting input 93 is directly connected to the signal summing junction 76 which in turn is coupled to the signal terminals 88 and 90 by means of summing resistors 94, 95. Intermediate the VAR* signal input terminal 88 and the resistor 95, however, is a simple signal inverting operational amplifier 96. An isolation resistor 97 is additionally connected between the input terminal 88 and the input to the inverting amplifier 96. The operational amplifier 92 of the regulator 74 additionally includes a series resistor-capacitor feedback network 98 coupled between the output 99 and the inverting input 93. The non-inverting input 100 is connected to ground by means of a fixed resistor 101.

A bi-polar signal clamp 78 is connected to the output 99 of the operational amplifier 92 and is comprised of a pair of oppositely poled diodes 102 and 103 commonly coupled to the inverting input 93 via the summing junction 76. The opposite terminals of the diodes 102 and 103 are respectively coupled to intermediate points of a voltage divider network including series connected resistances 104, 105, 106 and 107 connected between $+V$ and $-V$ reference voltage terminals 108 and 109. As shown, the resistances 104 and 107 comprise variable resistance for controlling the respective bias voltages applied to the diodes 102 and 103 which voltages must be overcome by the voltage level at the output 99 of the operational amplifier 92 and in so doing becoming conductive to provide the desired clamping effect inasmuch as the output 99 of the operational amplifier 92 is connected to the common connection between resistances 105 and 106. The clamped output of the operational amplifier 92 is next applied to signal summing junction 68 by way of the summing resistor 110.

In order to provide the proper signal polarity as well as a signal gain to the angle command signal $\alpha^*$, the summing junction 68 is coupled to the inverting input 111 of an operational amplifier 112 whose non-inverting input 114 is connected directly to ground. An angle command signal $\alpha^*$ which is adapted to control the thyristor firing circuit 52 of FIG. 3 is thus provided at the output 113 of the operational amplifier.

The non-linear network 80 which models the operational characteristic of the var generator 20 is coupled to the summing junction 68 and the operational amplifier 112 by means of summing resistor 116. The network 80 is a composite of several individual active circuit elements including a non-linear amplifier 117, an active clamp 118, a comparator 119 and a summing amplifier 120. The non-linear amplifier 117 is comprised of an operational amplifier 121 which has an inverting input 122 connected to a gain setting potentiometer 123 which in turn is coupled to the output of a voltage follower operational amplifier 124 whose non-inverting input 125 is directly connected to the wiper of a potentiometer 126, the latter being operable to implement the K and 1−K signal scaling elements 82 and 84 of FIG. 3 as well as the summing junction 86. The non-linear amplifier 117 further includes a feedback network including a diode 127 connected between the operational amplifier output 128 and the inverting input 122 and is biased by means of a resistive network comprised of a potentiometer 129, coupled across a $+V$ reference potential, and a pair of voltage divider resistors 130 and 131. The operation of the diode 127 is to provide a signal breakpoint when the diode 127 becomes conductive to alter an otherwise linear output characteristic for providing an analog of the non-linear portion 42 of actual characteristic curve (FIG. 2). Additional circuits similar to that made up of diode 127 and resistors 129, 130 and 131 can be added, when desirable, to provide additional breakpoints to improve the accuracy of the model of the non-linear function.

The clamp circuit 118 has for its purpose modeling the linear portion 40 of the characteristic curve in the region of 90° lagging (FIG. 2), whereas the step function circuit 119 is adapted to model the portion 46 of the characteristic curve. As shown in FIG. 4, the clamp circuit 118 is comprised of an operational amplifier 132 which has its inverting input 133 connected to output 134 of the summing amplifier 120 comprised of an operational amplifier 135. The coupling between the output 134 and the input 133 is made by way of a fixed resistor 136. The output 137 of the operational amplifier 132 is coupled to the inverting input 122 of the operational amplifier 121 of the non-linear amplifier 117 by means of a diode 138 and coupling resistor 139. Also connected to inverting input 122 is a potentiometer 140 coupled across a $-V$ reference voltage as well as the fixed resistor 141. The potentiometer 140 acts to provide a forward offset in the non-linear characteristic.

The operation of clamp circuit 118 is as follows. The reference voltage provided by potentiometer 143 represents the value of $\alpha=90°$. The actual value of alpha commanded $\alpha^*$ by the non-linear feed-forward network is present at point 134. This signal is of inverse polarity. The actual value (inverted) and reference value are connected back to the inverting input 133 of operational amplifier 132 by resistors 136 and 144 respectively. This connection causes the output 137 of operational amplifier 132 to be responsive to the difference between the voltages at 143 and 134. The voltage at 137 will be negative when the alpha signal commanded by 137 is greater than 90°. This causes diode 138 to block and thus renders the clamp 118 inactive. However, when point 134 reaches $\alpha=90°$, point 137 swings positive. This causes diode 138 to become conducting, thereby activating the clamp. A signal is injected into summing junction 122, which signal prevents further advance of the signal 134 beyond that representing $\alpha=90°$. The resistor 145 defines the gain of amplifier 132 and makes its clamping action linear. Any further command for lagging vars after the clamp is active will produce a voltage at 134 representing a slightly advancing value of α. Thus the slope of portion 40 of the actual characteristic is controlled by resistor 145 in conjunction with the other resistor values in the clamp network 118. Capacitor 146 provides for stable operation of the closed loop clamp function.

The step function circuit 119 is basically comprised of a voltage comparator 147 which is adapted to activate an electronic switch device 148 to apply a predetermined +V voltage to summing junction 149 along with the output of the non-linear operational amplifier 117, the latter being applied by means of summing resistor 150 while the +V voltage from the switch 148 is applied via summing resistor 152.

Further to the step function circuit 119, the inverting input 153 of comparator 147 is connected to a potentiometer 154 coupled across a source of reference voltage +V means of the resistor 155. The non-inverting input 156 is connected to the VAR* signal input terminal 88 by means of the fixed resistor 157 and a grounded capacitor 158. A fixed resistor 159 is connected from the output 160 of the operational amplifier 147 back to the non-inverting input 156 to provide hysteresis. A fixed capacitor 161 also is connected across the two inputs 153 and 156 for noise suppression. When the amplitude of the VAR* signal exceeds the level set by the potentiometer 154, the output of the comparator 147 is coupled to the switch 148. Signal coupling is provided by means of the resistor 162 along with a diode 163, which is shown connected to ground, and biased by a resistor 164 which is coupled to a +V reference potential by fixed resistor 164. The switch 148 furthermore is connected to the summing resistor 152 by means of coupling resistor 165 and a filter capacitor 166. The switch 148 is activated when the output level of the comparator 147 goes negative and overcomes the positive bias on the diode 163 which provides the inverting input terminal 167 of the switch.

With the summing junction 149 connected to the inverting input 168 of the summing operational amplifier 135, whose non-inverting input 169 is connected to ground, the output signal at the output 134 comprises an electrical analog of the operating characteristic shown in FIG. 2, which when applied to the summing junction 68 and the summing operational amplifier 112, generates an angle command signal α* which causes a substantially linear response of the var generator in the leading and lagging var operational mode.

Referring back now to FIG. 3, when the load 56 connected to the three phase AC source 10 comprises an inductive load such as a motor, the question arises as to the need for both lagging and leading var generation for compensation since a motor load comprises an inductive reactance load impedance which primarily requires leading var compensation. It should be pointed out, however, that the fixed compensating capacitance 64, coupled across the load 56, itself requires compensation when the load 56 becomes ineffective and virtually disappears so that the AC course 10 becomes effectively capacitively loaded, requiring lagging var compensation. Thus with the control configuration disclosed in FIGS. 3 and 4, a linear control is provided over the entire range of loads from high lagging vars through zero to high leading vars.

While there have been shown and described what are at present considered to be the preferred embodiments of the invention, it is evident that this control could, when desirable, be implemented in a digital computing controller. This and other modifications thereto will readily occur to those skilled in the art. It is not desired, therefore, that the invention be limited to the specific arrangements shown and described, but it is intended to cover in the appended claims all such modifications as fall within the true spirit and scope of the invention.

We claim:

1. A control scheme for linearizing the non-linear operational characteristic of a static var generator coupled to a source of alternating current power, comprising:
    (a) an inductively loaded force commutated thyristor inverter coupled to said alternating current source and operating as a current source var generator;
    (b) means responsive to a gating angle command signal for controlling thyristor firing angle of said inverter for generating at least leading vars;
    (c) means for establishing a var command signal corresponding to a command for vars;
    (d) control means having a non-linear signal transfer function for generating a gating angle command signal which is variable in response to said var command signal; and
    (e) means coupled to said control means for applying said gating angle command signal to said means for controlling said firing angle of said inverter.

2. The control scheme of claim 1 wherein said non-linear signal transfer function models at least a portion of the operational characteristic of said var generator.

3. The control scheme of claim 2 wherein said portion of said non-linear operational characteristic of said var generator includes adjoining regions including a step function characteristic region and a non-linear function characteristic region.

4. The control scheme of claim 1 and further comprising:
    (f) means for establishing a var signal corresponding to actual vars generated.
    (g) means for respectively scaling said var command signal and said var signal;
    (h) means for summing said scaled var command signal and said scaled var signal and providing a summed var signal thereby; and
    (i) means for coupling said summed var signal to said control means.

5. The control scheme of claim 4 wherein said means for respectively scaling said var command signal and said var signal includes means for scaling said var command signal and said var signal by a factor K and 1−K, respectively, where K is equal to or less than unity.

6. The control scheme of claim 1 and further comprising:
    (f) means for establishing a var signal corresponding to the actual vars generated;
    (g) means for differencing said var command signal and said var signal and providing a difference var signal thereby;
    (h) another control scheme responsive to said difference var signal and having a predetermined signal transfer function for generating another angle command signal;
    (i) means for combining said first recited angle command signal and said another angle command signal into a composite angle command signal;
    wherein said means for applying command signal to said means for controlling said firing angle includes means for applying said composite angle command signal thereto.

7. The control scheme of claim 6 wherein said predetermined signal transfer function of said another control means comprises a substantially linear transfer function.

8. The control scheme of claim 6 and further comprising:
(j) means for summing said var command signal and said var signal and providing a summed var signal thereby; and
(k) means for coupling said summed var signal to said first recited control means.

9. The control scheme of claim 8 and additionally including:
(l) means for scaling said var command signal and said var signal prior to being summed and wherein the scaled sum of said scaled signal is equal to or less than unity.

10. A control scheme for improving the operational characteristic of a current source var generator coupled to a source of alternating current power supplying a load, comprising:
(a) an inductively loaded force commutated thyristor inverter having a non-linear operational characteristic and being operable in both leading and lagging modes of operation to generate leading and lagging reactive volt-amperes (vars);
(b) means responsive to an angle command signal for controlling thyristor firing angle of said inverter;
(c) means for establishing a var command signal proportional to the desired var output from said inverter;
(d) means for generating an actual var signal proportional to the actual var output of said inverter;
(e) means for generating an error signal representative of any difference between said var command signal and said actual var signal;
(f) means for generating a summation signal of selectively scaled amplitude values of said var command signal and said actual var signal;
(g) first control means having a first transfer function for generating a first angle command signal which is variable in response to said difference between said var command signal and said actual var signal;
(h) second control means having a second signal transfer function for generating a second angle command signal which is variable in response to said summation signal; and,
(i) means for combining said first and second angle command signals and applying said command angle command signal to said means for controlling said thyristor firing angle.

11. The control scheme of claim 10 wherein said first transfer function comprises a substantially linear transfer function and wherein said second transfer function comprises a non-linear transfer function.

12. The control scheme of claim 10 wherein said first control means (g) comprises a feedback signal means including regulator means responsive to said error signal and being operable to generate said first angle command signal, and
wherein said first angle command signal is essentially linearly proportional to said error signal.

13. The control scheme of claim 12 wherein said regulator means comprises function means having a generally linear signal transfer function, and
wherein said first control means further comprises a signal clamp means coupled to said regulator means and being operable to clamp the magnitude of said first angle command signal at predetermined limiting magnitude values.

14. The control scheme of claim 10 wherein said second control means comprises a non-linear network having a signal transfer function which models the non-linear operational characteristic of said var generator.

15. A control scheme of claim 14 wherein said operational characteristic modeled by said non-linear network comprises a characteristic wherein thyristor firing angle delay as a function of said second angle command signal includes a region of substantially linearly changing firing angle for a summation signal calling for lagging vars, a region of non-linearly varying firing angle for a summation signal calling for leading vars, and a step function region therebetween.

16. The control scheme of claim 10 wherein said means (f) for generating a summation signal includes:
(i) first and second signal scaling means respectively coupled to said var command signal and said actual var signal, said first and second signal scaling means having respective signal transfer functions whose combined gain is equal to an integer for providing reduced scaled values of said var signals thereby, and
(ii) signal summation means coupled to said first and second signal scaling means for summing the scaled values of said var command signal and actual var signal to generate said summation signal.

17. A control scheme of claim 16 wherein said first and second signal scaling means have signal transfer functions providing respective gains the summation of which is a constant.

18. The control scheme of claim 16 wherein said first and second signal scaling means have signal transfer functions providing signal gains of K and 1−K, repectively, where K ranges between and includes 0.5 and 1.0.

19. The control scheme of claim 16 wherein said first and second signal scaling means have signal transfer functions providing signal gains of K and 1−K, respectively, where K is equal to or less than unity.

20. The control scheme of claim 19 where K has a value substantially equal to 0.75.

21. A method for linearizing the non-linear operational characteristic of a current source var generator comprised of an inductively loaded force commutated thyristor inverter coupled to a source of alternating current power supplying a load, which method comprises the steps of:
(a) controlling the firing angle of the thyristors of said thyristor inverter by an angle command signal;
(b) generating a var command signal corresponding to a command for vars;
(c) generating a gating angle command signal which is non-linearly variable in response to said var command signal; and
(d) applying said gating angle command signal to means for controlling said firing angle of said inverter.

22. The method of claim 21 wherein said step (c) comprises generating said angle command signal with a non-linear signal transfer function which models at least a portion of the operational characteristic of said var generator.

23. The method of claim 22 and further comprising the steps of:
(e) generating a var signal corresponding to actual vars generated;

(f) summing said var command signal and said var signal and generating thereby a summed signal, and wherein said step (c) comprises generated said gating angle command signal in response to said summed signal.

24. The method of claim 22 and further comprising the steps of:
(e) generating a var signal corresponding to actual vars generated;
(f) selectively scaling said var command signal and said var signal;
(g) summing said scaled var command signal and said scaled var signal and generating thereby a summed signal thereby; and
wherein said step (c) comprises generating said gating angle command signal in response to said summed signal.

25. The method of claim 24 wherein said scaling step (f) comprises the step of scaling said var command signal and said var signal by a factor K and 1−K, respectively, where K is equal to or less than unity.

26. The method of claim 22 and further comprising the steps of:
(e) generating an actual var signal corresponding to the actual vars generated;
(f) means for differencing said var command signal and said actual var signal and providing a difference var signal thereby;
(g) generating another gating angle command signal in response to said difference var signal;
(h) combining said first recited angle command signal and said another angle command signal into a composite angle command signal; and
wherein said controlling step (a) comprises controlling the thyristor firing angle of said inverter by said composite angle command signal.

27. The method of claim 26 wherein said step (g) comprises generating said another gating angle command signal with a substantially linear transfer function in response to said difference var signal.

28. The method of claim 26 and further comprising the steps of:
(i) scaling said var command signal and said actual var signal by a factor K and 1−K, respectively, where K is equal to or less than unity;
(j) summing said scaled var command signal and said scaled actual var signal and generating a summed var signal thereby; and
wherein said step (c) comprises generating said gating angle command signal in response to said summed var signal.

29. The method for improving the non-linear operational characteristic of a current source var generator comprised of an inductively loaded force commutated thyristor inverter coupled to a source of alternating current power supplying a load, which method comprises the steps of:
(a) controlling thyristor firing angle of said inverter in response to a composite angle command signal;
(b) generating a var command signal proportional to the desired var output from said inverter;
(c) generating an actual var signal proportional to the actual var output of said inverter;
(d) generating an error signal representative of any difference between said var command signal and said actual var signal;
(e) generating a summation signal of selectively scaled amplitude values of said var command signal and said actual var signal;
(f) generating a first angle command signal in accordance with a first signal transfer function, said signal being variable in response to said difference between said var command signal and said actual var signal;
(g) generating a second angle command signal in accordance with a second signal transfer function, said signal being variable in response to said summation signal; and
(h) combining said first and second angle command signal into said composite angle command signal for controlling said thyristor firing angle.

30. The method of claim 29 wherein said first transfer function comprises a substantially linear transfer function.

31. The method of claim 29 wherein said first transfer function comprises a substantially linear transfer function and wherein said second transfer function comprises a non-linear transfer function which models at least a portion of the non-linear operational characteristic of said var generator.

32. The method of claim 29 wherein said first transfer function comprises a substantially linear transfer function and wherein said second transfer function models the non-linear operational characteristic of said var generator.

33. The method of claim 29 wherein said step (f) includes the step of scaling said var command signal and said actual var signal by the gain factors K and 1−K, respectively, where K is equal to or less than 1.0.

34. The method of claim 33 where K ranges between 0.5 to 1.0.

* * * * *

UNITED STATES PATENT AND TRADEMARK OFFICE
CERTIFICATE OF CORRECTION

PATENT NO. : 4,496,899
DATED : January 29, 1985
INVENTOR(S) : David L. Lippitt and Loren H. Walker It is certified that error appears in the above–identified patent and that said Letters Patent are hereby corrected as shown below:

Column 4, line 6, delete "$0°14\ 360°$" and substitute $--0°-360°--$.

Signed and Sealed this

Sixth Day of August 1985

[SEAL]

Attest:

DONALD J. QUIGG

Attesting Officer — Acting Commissioner of Patents and Trademarks